(12) United States Patent
Shintani et al.

(10) Patent No.: US 7,915,889 B2
(45) Date of Patent: Mar. 29, 2011

(54) LINEAR DISPLACEMENT DETECTION APPARATUS

(75) Inventors: Hiroyuki Shintani, Nagoya (JP); Hisataka Okado, Chita-gun (JP); Yoshiyuki Kono, Obu (JP); Takashi Kawashima, Nagoya (JP); Takamitsu Kubota, Kariya (JP); Shinji Ikeda, Mishima (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 429 days.

(21) Appl. No.: 12/207,799

(22) Filed: Sep. 10, 2008

(65) Prior Publication Data

US 2009/0066322 A1 Mar. 12, 2009

(30) Foreign Application Priority Data

Sep. 10, 2007 (JP) ................................. 2007-233963

(51) Int. Cl.
*G01B 7/14* (2006.01)
*G01B 7/30* (2006.01)

(52) U.S. Cl. .............................. 324/207.24; 324/207.25
(58) Field of Classification Search .................... None
See application file for complete search history.

(56) References Cited

U.S. PATENT DOCUMENTS 5,742,161 A * 4/1998 Karte ........................ 324/207.16
7,215,113 B2 * 5/2007 Kinoshita ................ 324/207.24

FOREIGN PATENT DOCUMENTS

JP 10-2706 1/1998

* cited by examiner

*Primary Examiner* — Minh N Tang
(74) *Attorney, Agent, or Firm* — Nixon & Vanderhye PC

(57) ABSTRACT

A linear displacement detection apparatus is configured to convert a linear displacement of a shaft into a rotary displacement of a sensor rotor of a rotary displacement sensor so as to detect the linear displacement. A sensor lever is fixed to the sensor rotor and rotatable about an axis of the sensor rotor. A sensor rod is located closer to the shaft than the sensor lever and configured to transmit the linear displacement of the shaft to the sensor lever. A bearing member is located closer to the shaft than the sensor rod and configured to release rocking of the shaft.

17 Claims, 11 Drawing Sheets

LINEAR DISPLACEMENT DETECTION APPARATUS

CROSS REFERENCE TO RELATED APPLICATIONS

This application is based on and incorporates herein by reference Japanese Patent Application No. 2007-233963 filed on Sep. 10, 2007.

FIELD OF THE INVENTION

The present invention relates to a linear displacement detection apparatus for converting a linear displacement of a shaft into a rotary displacement of a sensor rotor of a rotary sensor so as to detect the linear displacement using the rotary sensor.

BACKGROUND OF THE INVENTION

For example, JP-A-10-002706 discloses a linear displacement detection apparatus. As shown in FIG. 25, the conventional linear displacement detection apparatus is configured to convert one-dimensional displacement (linear displacement, linear motion) of a shaft 101 into a rotary displacement (rotary motion) of a sensor lever 104 so as to detect the linear displacement. The sensor lever 104 is fixed to a sensor rotor of a rotation angle sensor 102. The sensor lever 104 has one end at the side of the sensor rotor, and the one end is rotatably and pivotally supported by a rotation axis 103 of the rotation angle sensor 102. The sensor lever 104 has the other end at the side of the shaft 101, and the other end has an elongated hole 105. The elongated hole 105 is screwed with a contact portion 111 of the shaft 101.

The rotation angle sensor 102 accommodates a sensor rotor and a printed circuit board. Together with the sensor lever 104, the sensor rotor is provided to the rotation axis 103. The printed circuit board is opposed to the sensor rotor. An arc-shaped resistive element pattern and an arc-shaped conductive element pattern are provided on the printed circuit board. The arc-shaped resistive element pattern is coaxial with the arc-shaped conductive element pattern. The sensor rotor is provided with a brush, which electrically conducts the resistive element pattern with the conductive element. The rotation angle sensor 102 as a displacement sensor is configured to convert the rotation angle of the sensor rotor into an electric signal and output the electric signal. The rotation angle sensor 102 is configured to detect the linear displacement (shaft displacement, present position) of the shaft 101.

In the conventional linear displacement detection apparatus, in the case where the shaft 101 is exerted with a radial rock in addition to linear displacement, the radial rock of the shaft 101 exerts torsion to the sensor lever 104. Consequently, the radial rock of the shaft 101 acts as the linear displacement of the shaft 101 and causes an error of the linear displacement of the measurement of the shaft 101. In this case, rocking of the shaft 101 exerts torsion to the sensor lever 104. Consequently, the rocking of the shaft 101 applies load to the sensor lever 104. Thus, the sensor lever 104 needs sufficient strength against cyclic stress caused by the load. Furthermore, in a structure where the rotation axis 103 of the rotation angle sensor 102 is located in an offset manner with respect to the sensor rotor and the shaft 101, the sensor lever 104 is supported by one side. In this case, the sensor lever 104 is twisted when transmitting the displacement of the shaft 101, and hence the twist of the sensor lever 104 cause an error in detection of the linear displacement of the shaft 101. Furthermore, in the conventional linear displacement detection apparatus, the contact position between a contact portion 111 of the shaft 101 and the elongated hole 105 of the sensor lever 104 may change, and distortion occurs in the contact position when the linear displacement of the shaft 101 is converted into the rotary displacement of the sensor lever 104.

In the conventional linear displacement detection apparatus, distortion caused in the conversion of the linear displacement of the shaft 101 into the rotary displacement of the sensor lever 104 is released by changing the physical relationship between the contact portion 111 of the shaft 101 and the elongated hole 105 of the sensor lever 104. That is, the distortion is released by changing the turning radius (R) of the sensor lever 104 using the elongated hole 105. In this case, as the turning radius (R) of the sensor lever 104 becomes large, the change in the rotation angle of the sensor lever 104 with respect to the linear displacement of the shaft 101 becomes small. Alternatively, as the turning radius (R) of the sensor lever 104 becomes small, the change in the rotation angle of the sensor lever 104 with respect to the linear displacement of the shaft 101 becomes large. Accordingly, when the turning radius (R) of the sensor lever 104 changes, the relationship between the linear displacement of the shaft 101 and the rotation angle of the sensor lever 104 becomes nonlinear. Consequently, detecting accuracy of the linear displacement of the shaft 101 is impaired.

SUMMARY OF THE INVENTION

In view of the foregoing and other problems, it is an object of the present invention to produce a linear displacement detection apparatus configured to reduce an error caused in measurement of a linear displacement of a shaft. It is another object of the present injection to produce a linear displacement detection apparatus configured to enhance accuracy of measurement of the linear displacement of the shaft.

According to one aspect of the present invention, a linear displacement detection apparatus for converting a linear displacement of a shaft into a rotary displacement of a sensor rotor of a rotary displacement sensor so as to detect the linear displacement, the linear displacement detection apparatus comprises a sensor lever connected to the sensor rotor and rotatable about an axis of the sensor rotor. The linear displacement detection apparatus further comprises a sensor rod located closer to the shaft than the sensor lever and configured to transmit the linear displacement of the shaft to the sensor lever. The linear displacement detection apparatus further comprises a bearing member located closer to the shaft than the sensor rod and configured to release rocking of the shaft.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment (Construction of First Embodiment)

Figure 1:
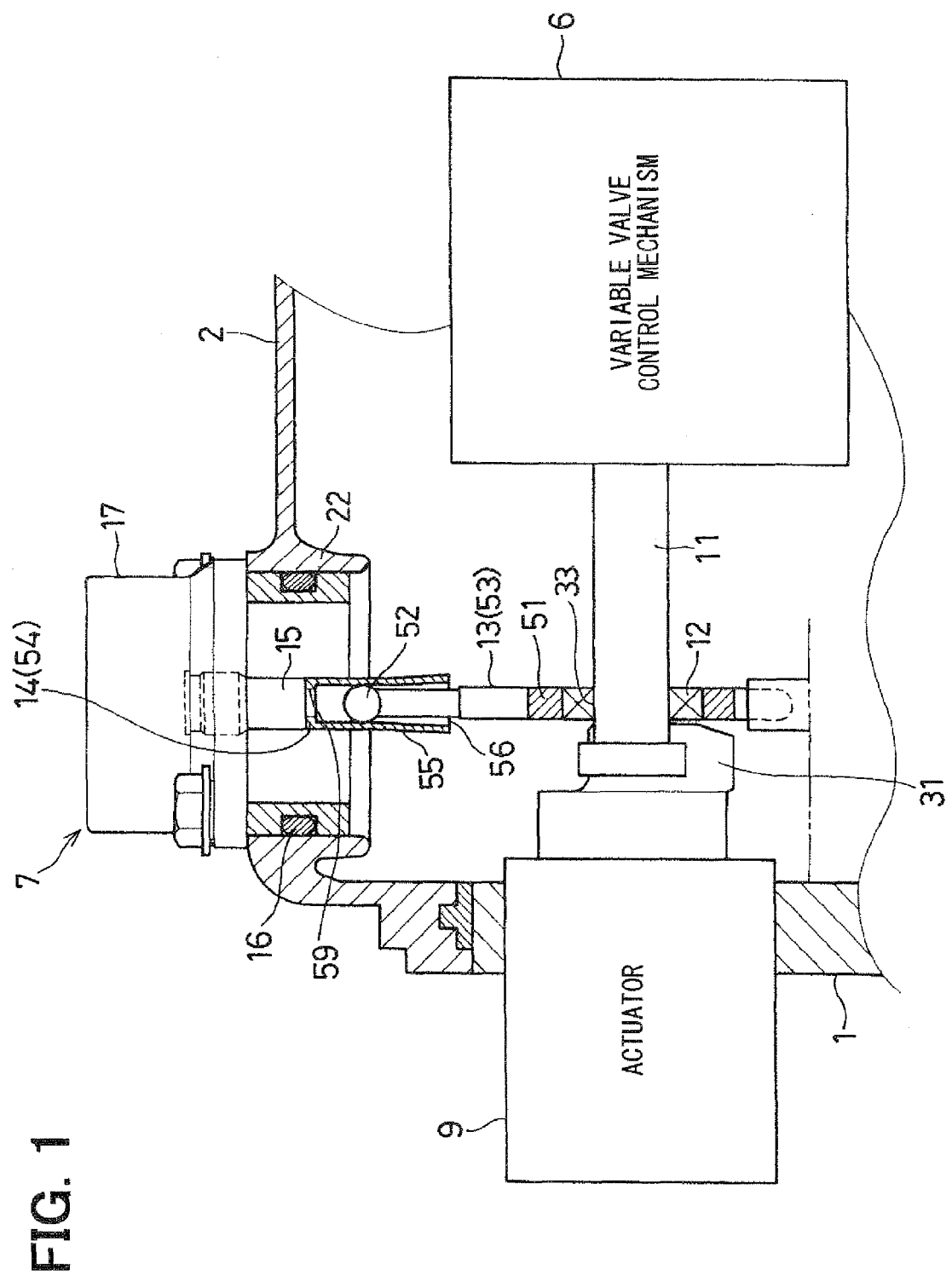
FIG. 1 is a schematic view showing a structure of an inline four-cylinder engine provided with a linear displacement detection apparatus according to a first embodiment.

As follows, a linear displacement detection apparatus mounted to an internal combustion engine will be described with reference to FIGS. 1 to 11. In the present embodiment, the linear displacement detection apparatus is used for an inline four-cylinder engine as an example.

According to the present first embodiment, the internal combustion engine is provided to an internal combustion engine such as an inline four-cylinder engine, which is mounted in an engine room of a vehicle such as an automobile. The engine is configured to generate output power as thermal energy produced by burning mixture of intake air and fuel in each combustion chamber. The engine includes a cylinder head 1, which is airtightly joined with a downstream end of an intake pipe, and a cylinder block, which therein has a cylinder bore (not shown). A head cover 2 is mounted to an upper and lateral side portion of the cylinder head 1.

As shown in FIGS. 1 to 6, according to the present embodiment, a valve control system for the engine includes an air intake valve 3, a rocker arm 4, a camshaft 5, a variable valve control mechanism 6, and an engine control unit (ECU). The air intake valve 3 is provided for opening and closing an intake port of the cylinder head 1. The rocker arm 4 is pivotally supported by the cylinder head 1. The camshaft 5 is rotated in conjunction with a crankshaft of the engine. The variable valve control mechanism 6 is provided between the rocker arm 4 and the camshaft 5. The engine control unit as an engine control system, ECU controls the variable valve control mechanism 6 in relation to each system such as a throttle control device.

Figure 2:
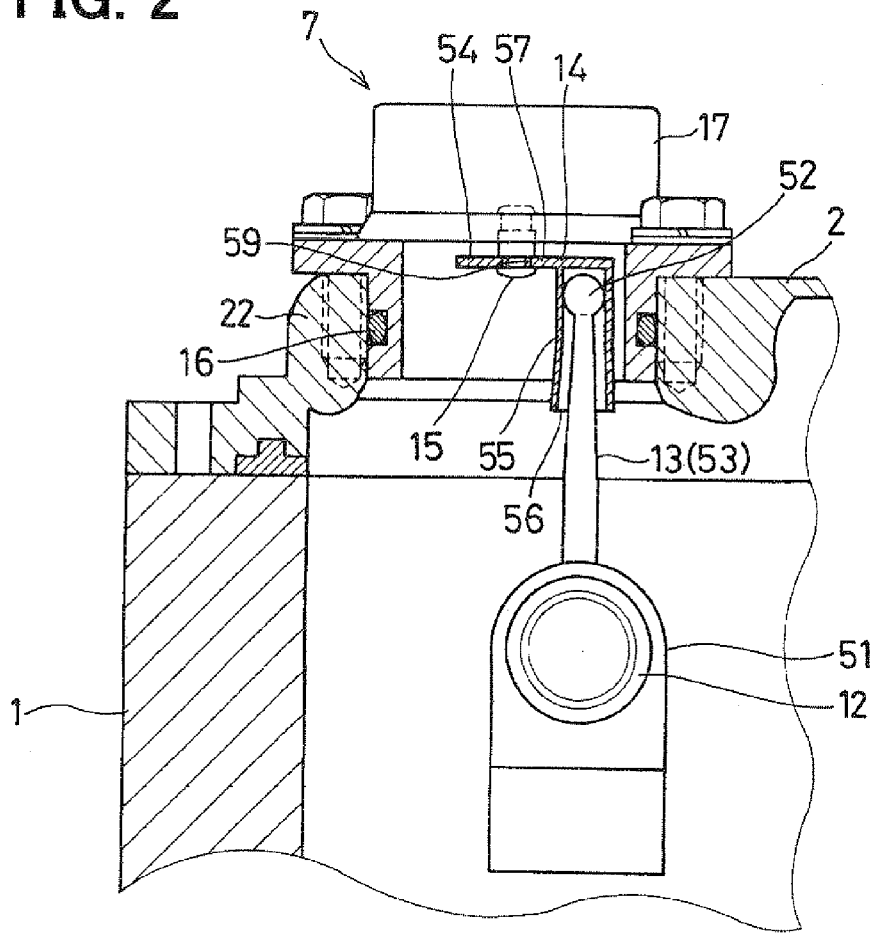
FIG. 2 is a schematic view showing the structure of the inline four-cylinder engine provided with the linear displacement detection apparatus according to the first embodiment, the structure being viewed from a perspective other than FIG. 1.
Figure 3:
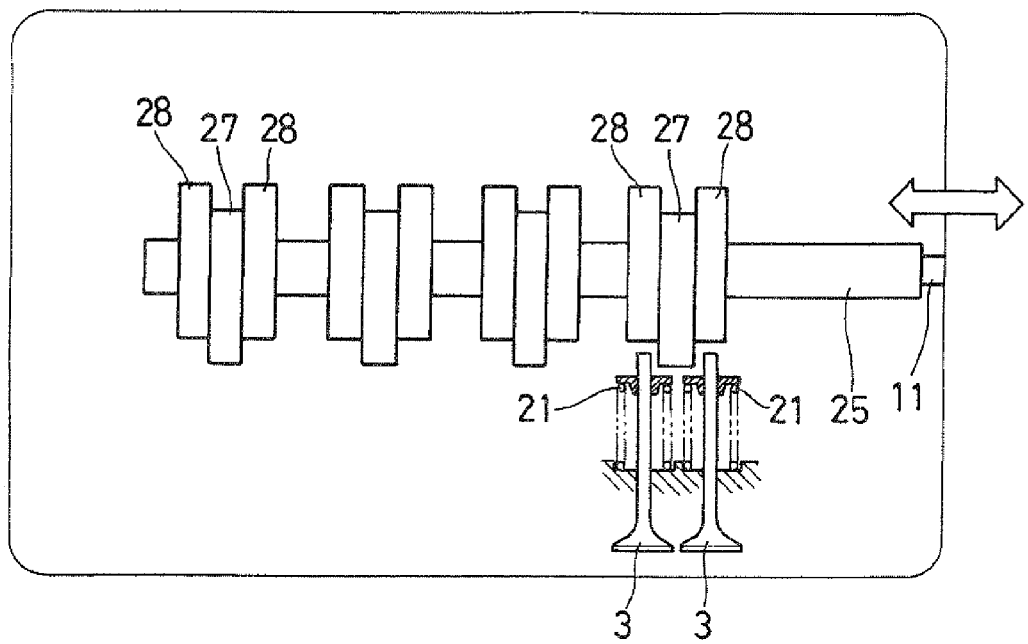
FIG. 3 is a schematic view showing the structure of the inline four-cylinder engine according to the first embodiment.
Figure 4:
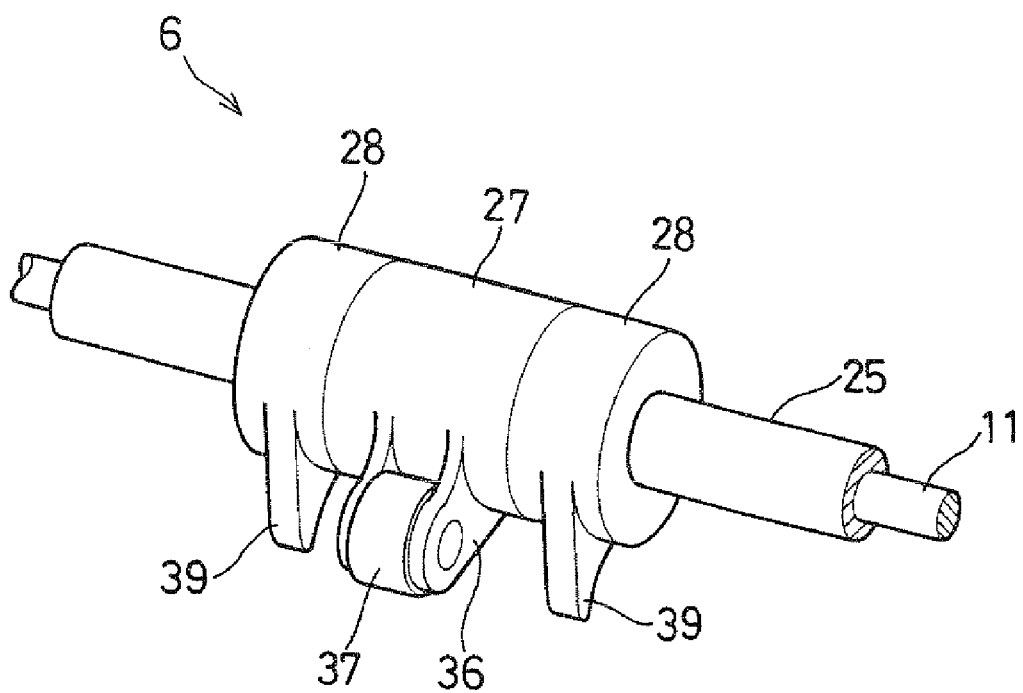
FIG. 4 is a perspective view showing the structure of the inline four-cylinder engine according to the first embodiment.

As shown in FIGS. 1, 2, the engine according to the present embodiment is provided with a linear displacement detection apparatus. The linear displacement detection apparatus is configured to receive a linear displacement as a linear motion in the axial direction of a control shaft 11 of the variable valve control mechanism 6 via a bearing 12, a sensor rod 13, and a sensor lever 14. The linear displacement detection apparatus is configured to convert the linear motion of the control shaft 11 to a rotary displacement as a rotary motion of a sensor rotor (rotation axis) 15 of a rotation angle sensor 7 so as to detect the linear displacement of the control shaft 11. The rotation angle sensor 7 is equivalent to a rotary displacement sensor. The engine is mounted with an actuator 9 as a shaft actuating device, which is configured to linearly actuate the control shaft 11 in the axial direction.

One side of the cylinder head 1 defines multiple intake ports respectively opened and closed using poppet-type intake valves 3. The other side of the cylinder head 1 defines multiple exhaust ports (not shown) respectively opened and closed using poppet-type exhaust valves. A valve spring 21 is provided to each of the intake valves 3, and a valve spring (not shown) is provided to each of the exhaust valves.

Figure 5A:
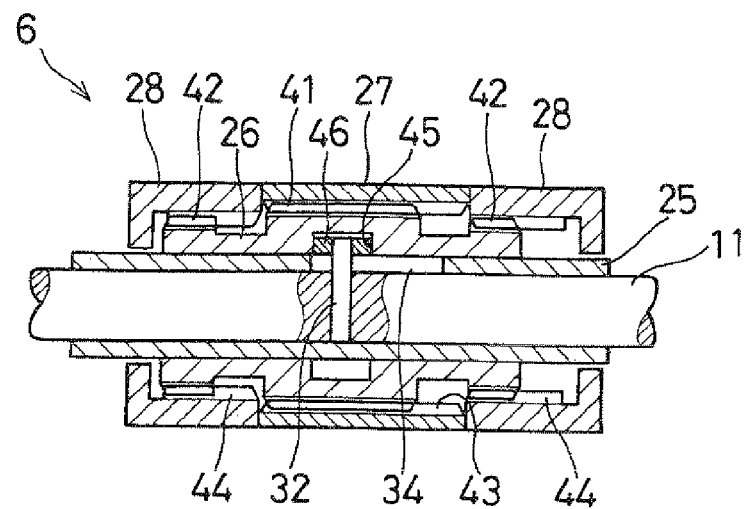
FIG. 5A is a cross-sectional view showing a variable valve control mechanism of the inline four-cylinder engine.
Figure 5B:
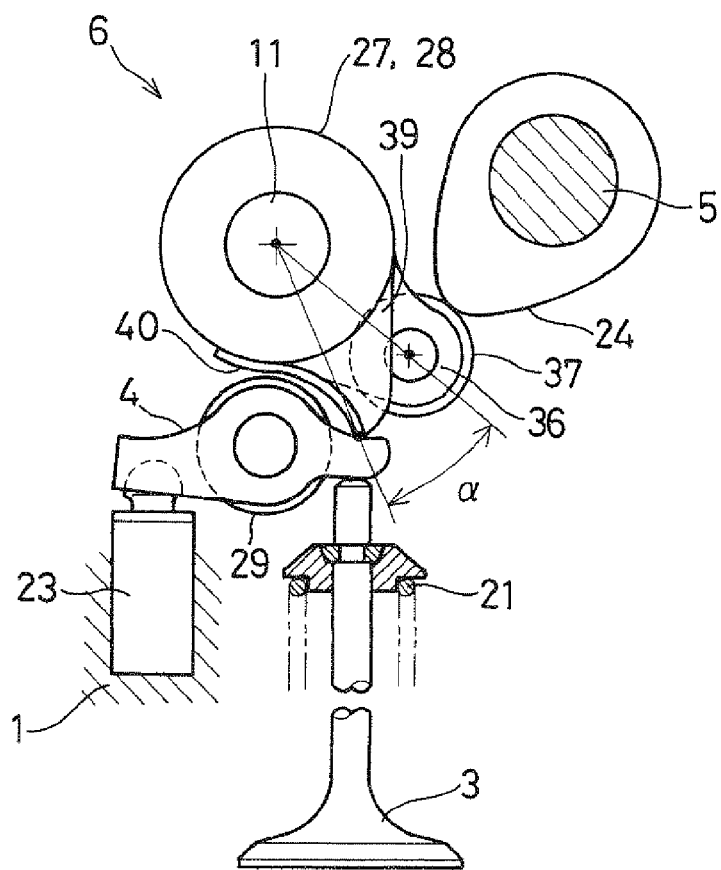
FIG. 5B is a schematic view showing the valve control device of the inline four-cylinder engine, according to the first embodiment.
Figure 6A:
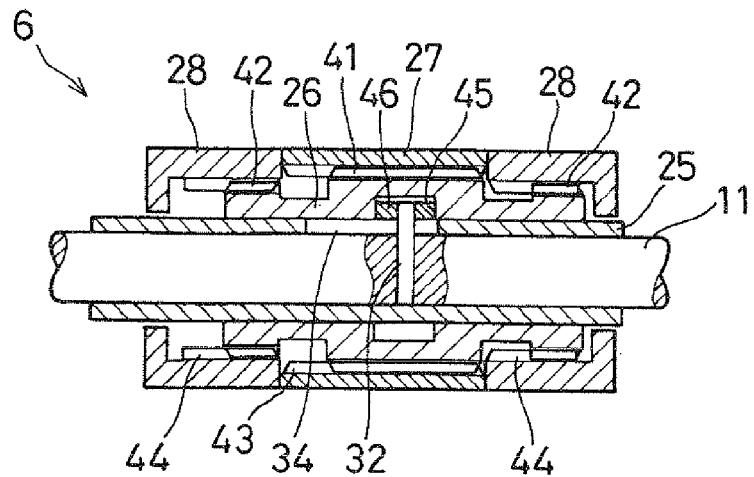
FIG. 6A is a cross-sectional view showing a variable valve control mechanism of the inline four-cylinder engine.
Figure 6B:
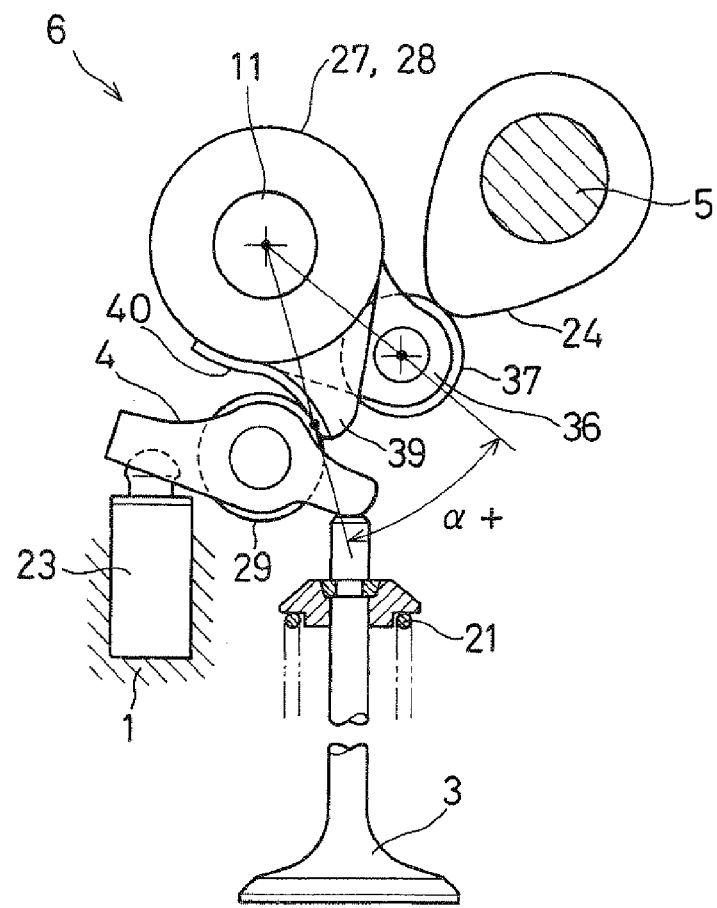
FIG. 6B is a schematic view showing the valve control device of the inline four-cylinder engine, according to the first embodiment.

The cylinder head 1 is provided with sparkplugs (not shown) each having a tip end being exposed to the combustion chamber of each cylinder. Sparkplugs (not shown) are attached to the cylinder head 1. A tip end of each of the sparkplugs is exposed to the combustion chamber of each engine cylinder. The cylinder head 1 is provided with an injector (not shown) for injecting fuel into an intake port at an optimal timing. The head cover 2 has a cylindrical sensor-fitted portion 22 as a circular opening. The rocker arm 4 has a base end, which is, for example, rotatably supported by a tip end of a hydraulic lash adjuster 23 (FIG. 5B). The hydraulic lash adjuster 23 may be provided to the cylinder head 1. The outer circumferential periphery of the camshaft 5 is integrally provided with cams 24.

The engine according to the present embodiment controls intake air flowing into the combustion chamber of each engine cylinder by continuously changing the valve lift of each of the intake valves 3. The valve working angle also changes simultaneously with the change in the valve lift. Therefore, the change in the valve lift described below also corresponds to the change in the valve working angle.

A throttle valve is provided in a throttle body, which is joined with the upstream of an intake pipe of the engine. More specifically, the throttle valve is provided to, for example, an intake manifold or a surge tank. In general, the lift of the throttle valve is in the full open state in a structure where the intake air is controlled by changing the valve lift of the intake valve 3. For example, the throttle valve is controlled at the full open state when the engine is started, and alternatively, the throttle valve is controlled at the full close state when the engine is stopped. When a malfunction occurs in the variable valve control mechanism 6, and the valve lift of the intake valve 3 becomes inoperative in consequence, the throttle valve is controlled to manipulate the intake air.

As shown in FIGS. 3 to 6B, the variable valve control mechanism 6 includes the control shaft 11, a rocker shaft 25, a slider gear 26, an input gear 27, and an output gear 28. The control shaft 11 is substantially in parallel with the camshaft 5. The rocker shaft 25 is in a hollow cylinder shape and fitted to the outer circumferential periphery of the control shaft 11. The slider gear 26 is linearly movable in conjunction with the control shaft 11. The input near 27 as an input arm and the output gear 28 as an oscillating cam are meshed with the slider gear 26. In the present embodiment, a pair of the intake valves 3 and a pair of the rocker arms 4 are provided to each cylinder of the engine The pair of intake valves 3 is opened and closed by each cam 24 In the variable valve control mechanism 6, each input gear 27 is provided for each cam 24 provided to each cylinder of the engine. Two output gears 28 are provided to both the sides of the input gear 27 correspondingly to the pair of intake valves 3 provided for each cylinder of the engine. That is, in the present embodiment, multiple variable valve control mechanisms 6 are included.

The control shaft 11 is connected with a connector 31 (FIG. 1) at the opposite side of the variable valve control mechanism 6, and the control shaft 11 is coupled with a ball screw shaft (not shown) of the actuator 9 via the connector 31. The control shaft 11 passes through the rocker shaft 25 of each of the multiple variable valve control mechanisms 6 in the axial direction. A connection pin 32 is inserted through the control shaft 11 in the radial direction so as to connect the control shaft 11 with the slider gear 26. The connection pin 32 protrudes from the outer circumferential periphery of the control shaft 11. The control shaft 11 has a bearing fitted portion 33 on the side of the connector 31, i.e., on the side of the actuator 9 in the axial direction, and the bearing fitted portion 33 is fitted with the bearing 12. The bearing fitted portion 33 is rotatable relative to the bearing 12. The position of the bearing fitted portion 33 is fixed relative to the bearing 12 in the axial direction.

The multiple rocker shafts 25 are substantially in parallel with the camshaft 5. The rocker shaft 25 is fixed to the cylinder head 1 or a cam career so as not to be movable in both the axial direction and the rotative direction. The control shaft 11 is inserted to the rocker shaft 25 and slidable in the axial direction therein. The outer circumferential periphery of each rocker shaft 25 is engaged with one input gear 27 and two output gears 28, which are rotatable around the center axis of the control shaft 11 and fixed in position in the axial direction. The rocker shaft 25 has an elongated hole 34 at a location corresponding to the connection pin 32. The connection pin 32 passes through the elongated hole 34.

Each input gear 27 has an arm portion 36 and a roller portion 37. The arm portion 36 protrudes in the direction to be away from the outer circumferential periphery of the rocker shaft 25. The roller portion 37 is rotatably connected with the tip end of the arm portion 36. The input gear 27 is provided at a location such that the roller portion 37 is in contact with the cam 24. Each of the two output gears 28 has a nose portion 39, which is substantially in a triangle shape and protrudes in the direction so as to be away from the outer circumferential periphery of the rocker shaft 25. The nose portion 39 has one side at the lower side in FIGS. 5B, 6B, and the one side defines a cam surface 40, which is in a shape of a curved concavity. The roller 29 attached to the rocker arm 4 is rotatably urged to the cam surface 40 by being exerted with biasing force of the valve spring 21 of the intake valve 3.

In the present embodiment, the variable valve control mechanism 6 is configured to manipulate a relative phase difference ($\alpha$) between the one input gear 27 and the two output gears 28 around the center axis of the rocker shaft 25 so as to arbitrary manipulate the valve lift of the intake valve 3. That is, the rocking angle of the rocker arm 4 is increased relative to the rocking angle of both the one input gear 27 and the two output gears 28 by increasing the relative phase difference therebetween, whereby the valve lift of the intake valve 3 is increased. Alternatively, the rocking angle of the rocker arm 4 is decreased relative to the rocking angle of both the one input gear 27 and the two output gears 28 by decreasing the relative phase difference therebetween, whereby the valve lift of the intake valve 3 is decreased.

Next, the mechanism configured to manipulate the relative phase difference ($\alpha$) is further described in detail. The outer circumferential periphery of the rocker shaft 25, the one input gear 27, and the two output gears 28 therebetween define a space, which accommodates the slider gear 26 being rotatable and axially movable relative to the rocker shaft 25. The slider gear 26 is substantially in a cylindrical shape. The outer circumferential periphery of the center portion of the slider gear 26 in the axial direction defines an input helical spline 41 as an input helical gear, which defines a right-hand thread. The slider gear 26 defines output helical splines 42 as output helical gears at both sides of the input helical spline 41, and each of the output helical splines 42 defines a left-hand thread.

Each of the one input gear 27 and the two output gears 28 has the inner periphery, which defines the space accommodating the slider gear 26, and the inner periphery defines helical splines 43, 44 correspondingly to the input helical spline 41 and the output helical splines 42. In the present structure, the input gear 27 defines the helical spline 43 defining the right-hand thread, and the helical spline 43 is geared to the input helical spline 41. Further, the output gear 28 defines the helical spline 44 defining the left-hand thread, and the helical spline 44 is geared to the output helical spline 42. The inner periphery of the slider gear 26 has a circumferential-direction groove 45 at the position corresponding to the connection pin 32. The circumferential-direction groove 45 accommodates the tip end of the connection pin 32. A bush 46 is provided in the circumferential-direction groove 45. The bush 46 has an insertion hole to which the tip end of the connection pin 32 is inserted.

The actuator 9 is a rotary direct-driven actuator, which includes a rotary direct-driven motion conversion mechanism configured to convert the rotary motion of an electric motor into a linear motion. The actuator 9 is configured to actuate the control shaft 11 linearly in the axial direction via the connector 31. The rotation direct-acting motion conversion mechanism includes, for example, a ball screw shaft configured to convert the rotary motion inputted from the electric motor into the linear motion, thereby linearly actuating the control shaft 11. The direction, in which the control shaft 11 is pulled out of the actuator 9, is defined as a forward direction, and the direction, in which the control shaft 11 is pulled into the actuator 9, is defined as a backward direction.

The actuator 9, in particular the electric motor is controlled in accordance with electricity caused by the ECU. The ECU includes a microcomputer including a CPU, a storage unit, an input circuit, an output circuit, and the like. The CPU executes control processings and arithmetic processings. The storage unit is a memory such as a ROM and a RAM that stores programs and data. Various sensors such as a vehicle speed sensor, a crank angle sensor, a accelerator position sensor, an airflow meter, a cooling water temperature sensor, and the rotation angle sensor 7 output detection signals. Each of the detection signals of the various sensors is subjected to A/D conversion using an A/D converter, so that each of the A/D-converted signals is transmitted to the microcomputer.

The ECU is configured to execute the control programs stored in the memory so as to control energization of the electric motor of the actuator 9 when an ignition switch is turned on (IG-ON). Further, the ECU is configured to manipulate throttle control devices such as the electric motor, which actuates a throttle valve; ignition devices such as an ignition coil and a sparkplug, and fuel injection devices such as an electric fuel pump and an injector. In the present structure, control command values as control target values such as the valve lift, the throttle position, the amount of intake air, the fuel injection quantity, and the like are controlled in the operation of the engine. When the ignition switch is turned OFF (IG-OFF), the ECU forcedly terminates the control programs.

The ECU changes the valve lift as a valve working angle by conducting the energization control of the electric motor of the actuator 9 to linearly displace the control shaft 11. Namely, the ECU controls the energization of the electric motor of the actuator 9 such that an actual valve lift coincides with a target valve lift when the actual valve lift as an actual valve working angle is different from the target valve lift as a target valve working angle. More specifically, the ECU controls the actuator 9 as follows. When the actual valve lift is larger than the target valve lift and the valve working angle is required to be reduced, the ECU controls the electric motor of the actuator 9 so as to displace the control shaft 11 in the forward direction. When the actual valve lift is smaller than the target valve lift and the valve working angle is required to be increased, the ECU controls the electric motor of the actuator 9 so as to displace the control shaft 11 in the backward direction.

In the present embodiment, the linear displacement detection apparatus includes the rotation angle sensor 7 and a linear-to-rotary converting mechanism. The rotation angle sensor 7 has a sensor rotor 15 and a housing 17. The linear-to-rotary converting mechanism converts the linear displacement of the control shaft 11 of the variable valve control mechanism 6 into the rotary motion of the sensor rotor 15 of the rotation angle sensor 7. The rotation angle sensor 7 includes a permanent magnet, a hall IC, and an open-type yoke. The permanent magnet is fixed to one end portion in the axial direction of the sensor rotor 15. The hall IC has a non-contact magnetism detection element for detecting the magnetic flux generated from the permanent magnet. The yoke has a divided structure to concentrate the magnetic flux generated by the magnet on the hall IC. The rotation angle sensor 7 is configured to detect the rotation angle of both the sensor lever 14 and the sensor rotor 15 in accordance with change in the output characteristic of the hall IC relative to the rotation angle of the magnet.

The ECU compares voltage (sensor output voltage) of the detection signal of the rotation angle sensor 7 with a target value, which is equivalent to a target valve lift. When the detection result of the rotation angle sensor 7 does not coincide with the target value even after elapse of a predetermined time, the ECU determines that a malfunction occurs in the variable valve control mechanism 6 and stores the determination result in the memory. That is, in the present embodiment, the linear displacement detection apparatus, in particular, the rotation angle sensor 7 serves as a linear displacement sensor (stroke sensor) used for malfunction-diagnosis determination of the variable valve control mechanism 6. The malfunction-diagnosis determination as an on-board diagnosis (OBD) is conducted by an in-vehicle diagnostic device. In the present embodiment, the malfunction of the variable valve control mechanism 6 may include incapability of the operation of the valve lift and/or incapability of smooth operation such as actuating of the control shaft 11 in the axial direction for manipulating the valve lift. The incapability may be caused by a damage caused to components such as the electric motor and a bearing of the actuator 9.

The sensor rotor 15 as a magnet rotor includes a magnet and rotatable relative to a hall IC and a yoke as a magnetic body. The sensor rotor 15 is rotatably supported inside the housing 17 in the state where a lower end of the sensor rotor 15 in FIG. 1 protrudes from the lower end surface of the housing 17 downward in FIG. 1. The housing 17 is fitted to the sensor-fitted portion 22 of the head cover 2. The housing 17 accommodates the hall IC and the yoke having the divided structure. The magnet is fixed to one axial end as a magnet mount portion of the sensor rotor 15 such that the magnet is rotatable accompanied with rotation of the sensor lever 14 and the sensor rotor 15. The magnet is magnetized in the radial direction perpendicular to the rotation axis as the rotary center of the sensor rotor 15.

The hall IC is located in a magnetic flux detection gap defined between opposed portions of the yoke. The hall IC is an integrated circuit (IC), which is configured by integrating a hall element and an amplification circuit. The hall element as a non-contact magnetism detection element outputs a voltage signal according to change in the density of magnetic flux, which intersects the hall IC to pass through the magnetic flux detection gap. The amplification circuit amplifies the output of the hall element. The voltage signal corresponds to the density of the magnetic flux, which passes through the magnetic flux detection gap. In the present structure, the hall IC outputs the sensor output voltage to the ECU.

The linear-to-rotary converting mechanism includes the bearing 12, the sensor rod 13, and the sensor lever 14. The bearing 12 is fitted to the outer circumferential periphery of the bearing fitted portion 33 of the control shaft 11 so as to release rocking motion of the control shaft 11. The sensor rod 13 transmits the linear displacement as the linear motion of the control shaft 11 to the sensor lever 14. The sensor lever 14 is fixed to the sensor rotor 15. The bearing 12 is located closer to the control shaft 11 than the sensor rod 13 to surround the outer circumferential periphery of the bearing fitted portion 33. The bearing 12 is fixed to one end portion as a bearing holding portion 51 in the axial direction of the sensor rod 13. The bearing 12 is press-fitted to the inner circumferential periphery of the bearing holding portion 51. Bearing members such as a slide bearing or a ball bearing may be employed instead of the bearing 12.

The sensor rod 13 is located closer to the control shaft 11 than the sensor lever 14. The sensor rod 13 has the bearing holding portion 51 in an end portion at a bearing-side end in the axial direction. The bearing holding portion 51 is in an annular shape. The bearing holding portion 51 surrounds the outer circumferential periphery of the bearing 12. The sensor rod 13 extends straight from the bearing holding portion 51 toward the sensor lever 14. The sensor rod 13 may be bent midway therethrough. The inner circumferential periphery of the bearing 12 and the outer circumferential periphery of the bearing fitted portion 33 of the control shaft 11 therebetween define a gap as a slidable clearance. The slidable clearance is defined so as to smoothly rotate the control shaft 11 inside the bearing 12 and so as to permit rotation of the bearing fitted portion 33 relative to the bearing 12.

The sensor rod 13 has the other end as a sensor lever side end in the axial direction, and the other end is provided with a contact portion with the sensor lever 14. The contact portion of the sensor rod 13 defines a fitting head 52, which is substantially in a spherical shape and integrally formed with the end of the sensor rod 13. A main body 53 of the sensor rod 13 is in contact with the sensor lever 14 via the fitting head 52. The fitting head 52 has a largest diameter portion having the outer diameter larger than the outer diameter of the main body 53 of the sensor rod 13. The fitting head 52 defines a contact face, which is in contact with a contact face of the sensor lever 14. The sensor rod 13 and the bearing 12 are includes in a linear displacement transmission mechanism, which transmits the linear displacement as the linear motion of the control shaft 11 to the sensor lever 14.

The sensor lever 14 includes a plate-shaped lever body 54. The plate-shaped lever body 54 is fixed to the tip end of the sensor rotor 15, which protrudes outside from the housing 17 to the lower side in FIG. 1. The sensor lever 14 is rotatable around the center axis of the sensor rotor 15 together with the sensor rotor 15. The sensor lever 14 is rotatable in the rotative direction around the axis of the sensor rotor 15, and thereby converting the linear displacement as the linear motion of the control shaft 11 into the rotary displacement as the rotary motion of the sensor rotor 15.

The lever body 54 of the sensor lever 14 has the end portion, which is provided with a contact portion. The contact portion of the lever body 54 is in contact with the fitting head 52 as the contact portion of the sensor rod 13. The contact portion of the sensor lever 14 is a cylinder portion 55 as an engagement portion. The cylinder portion 55 is integrally formed with the sensor lever 14 and inserted with the other end of the sensor rod 13 including the contact portion of the sensor rod 13. The cylinder portion 55 linearly extends downward in FIG. 1 in the thickness direction of the lever body 54 of the sensor lever 14 perpendicularly to the length and width directions of the lever body 54. The lower end of the cylinder portion 55 in FIG. 1 is provided with an opening as a rod insertion hole 56, which s configured to receive the fitting head 52 as the contact portion of the sensor rod 13. The inner wall surface of the cylinder portion 55 defines a contact surface, which is in contact with the contact surface of the fitting head 52 of the sensor rod 13. The other end of the lever body 54 of the sensor lever 14 is provided with a rotor fitted portion 57, which is fitted to the outer circumferential periphery of the sensor rotor 15. The rotor fitted portion 57 is provided with a fitting hole 59 through which the sensor rotor 15 passes.

(Operation of First Embodiment)

Next, an operation of the valve control system for the internal combustion engine according to the present embodiment is briefly described with reference to FIGS. 1 to 6.

When the roller portion 37 of the input gear 27 of the variable valve control mechanism 6 moves on the cam 24 of the camshaft 5, the one input gear 27 and the two output gears 28 are all together rocked, i.e., moved around the axis of the control shaft 11. In the present structure, when the camshaft 5 rotates, the input gear 27, which is in contact with the cam 24 via the roller portion 37, is first rocked, i.e., moved around the axis of the control shaft 11, and the two output gears 28 are also rocked around the axis of the control shaft 11 in conjunction with the input gear 27. The present motions of the output gears 28 are transmitted to the intake valve 3 via the rocker arm 4. Thus, the intake valve 3 is opened and closed. In the present structure, in which the one input gear 27 and the two output gears 28 are rocked, the slider gear 26 is spline-connected with the input helical spline 41 and the output helical splines 42, and the control shaft 11 is coupled with the slider gear 26 via the connection pin 32. In the present condition, when the camshaft 5 rotates, the control shaft 11 also rotates around the axis of the camshaft 5.

When the control shaft 11 moves in the axial direction, the slider gear 26 is biased from the control shaft 11 via the connection pin 32. Therefore, the input helical spline 41 and the output helical spline 42 simultaneously move in the axial direction of the control shaft 11. The one input gear 27 and the two output gears 28, which are spline-coupled with the input helical spline 41 and the output helical spline 42, are at the steady position with respect to the axial direction of the control shaft 11, regardless of the motion of the input helical spline 41 and the output helical spline 42. The one input gear 27 and the two output gears 28 rotate around the axis of the control shaft 11 via the spline-engagement with the helical splines 41 to 44 in conjunction with the motion of the input helical spline 41 and the output helical spline 42. In the present condition, the rotative direction of the input gear 27 is opposite to the rotative direction of the output gear 28, since the direction of the helical spline of the input gear 27 is opposite to the helical spline of the output gear 28. Thus, the relative phase difference between the one input gear 27 and the two output gears 28 changes, and the valve lift of the intake valve 3 is manipulated.

(Detecting Method of First Embodiment)

Figure 7A:
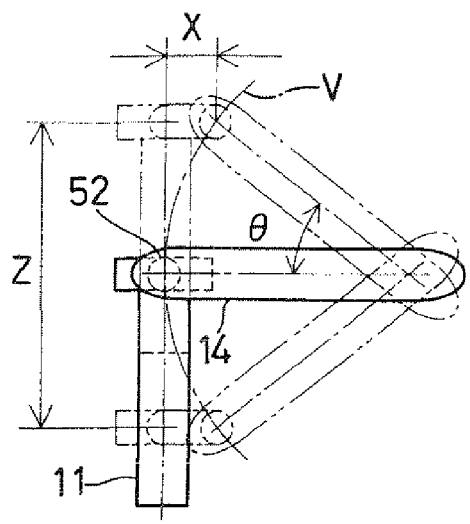
FIGS. 7A to 7C are schematic vies each showing motion of the control shaft and motion of the sensor lever according to the first embodiment.
Figure 7B:
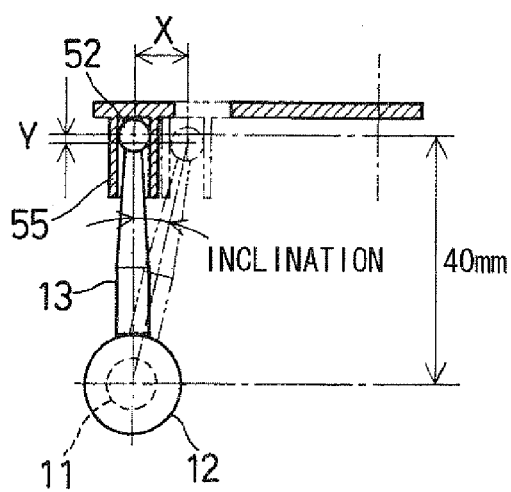
Figure 7C:
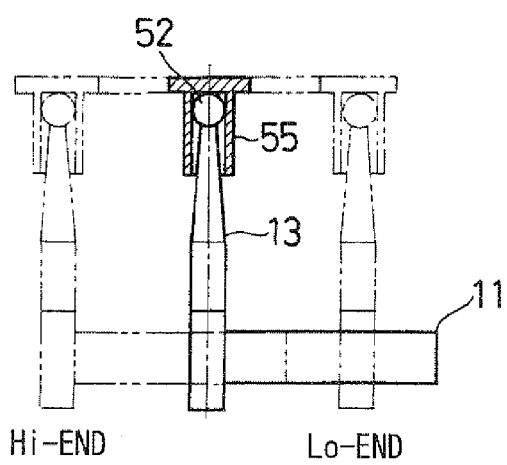

Next, a detecting method according to the embodiment is described with reference to FIGS. 1 to 7C. FIGS. 7A to 7C are schematic views each showing the linear motion of the control shaft 11 and the rotary motion of the sensor lever 14.

When the control shaft 11 moves in the axial direction, the bearing 12 and the sensor rod 13 also move in the axial direction of the control shaft 11. The fitting head 52 of the sensor rod 13 is engaged with the cylinder portion 55 of the sensor lever 14, and the contact face of the fitting head 52 of the sensor rod 13 is in contact with the contact surface of the cylinder portion 55 of the sensor lever 14. The rotor fitted portion 57 of the sensor lever 14 is fitted to the sensor rotor 15 of the rotation angle sensor 7. In the present structure, the linear displacement of the control shaft 11 is converted into the rotary displacement of the sensor lever 14, so that the rotation angle of the sensor lever 14 and the sensor rotor 15 is detected by the rotation angle sensor 7.

Figure 10A:
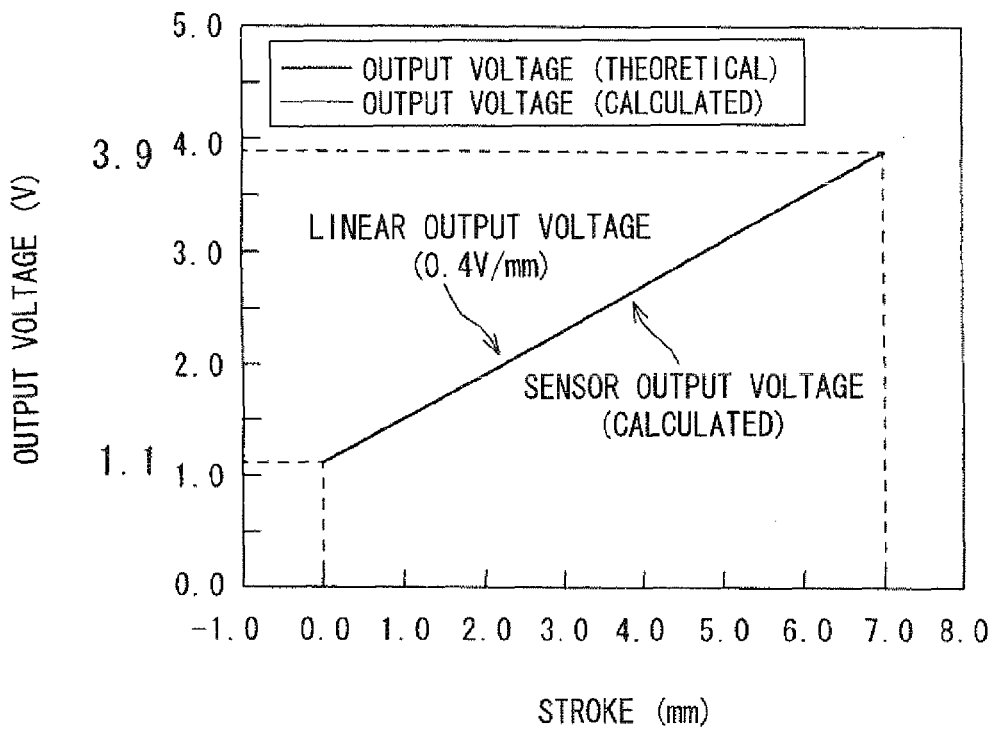
FIG. 10A is a graph showing a relationship between an output voltage of a rotation angle sensor and a stroke of the control shaft.

As shown by the graph in FIG. 10A, the ECU calculates the linear displacement as the stroke of the control shaft 11 in accordance with the sensor output voltage of the rotation angle sensor 7. The linear output voltage is represented by 0.4 V/mm, and the sensor output voltage is represented by $f(\theta)+2.5V$. Thus, the ECU calculates the valve lift as the detection result based on the stroke.

(Effect of First Embodiment)

In the present structure of the linear displacement detection apparatus according to the present embodiment, the outer circumferential periphery of the bearing fitted portion 33 of the control shaft 11 of the variable valve control mechanism 6 of the internal combustion engine, which is the inline four-cylinder engine as an example, and the inner circumferential periphery of the bearing holding portion 51 of the sensor rod 13 therebetween interpose the bearing 12. The bearing 12 is configured to releases torque exerted to rock the control shaft 11. In the present structure, even when the control shaft 11 is rocked around the axis of the control shaft 11 while the camshaft 5 rotates, the bearing 12, which is press-fitted to the inner circumferential periphery of the bearing holding portion 51 of the sensor rod 13, enables to release the rocking of the control shaft 11.

Thus, rocking of the control shaft 11 is hard to be transmitted to the sensor rod 13. In the present structure, when the linear displacement of the control shaft 11 is transmitted from the sensor rod 13 to the sensor lever 14, the sensor lever 14 can be restricted from being applied with torsion. Therefore, measurement error of the linear displacement of the control shaft 11 can be reduced. Furthermore, rocking of the control shaft 11 is hard to be transmitted to the sensor rod 13 and the sensor lever 14. Therefore, the sensor lever 14 can be restricted from being exerted with load caused by rocking of the control shaft 11. In the present structure, the sensor lever 14 need not be reinforced to enhance torsional strength in consideration of cyclic stress.

The linear-to-rotary displacement converting mechanism is provided to convert the linear displacement of the control shaft 11 of the variable valve control mechanism 6 into the rotary displacement of the sensor rotor 15 of the rotation angle sensor 7. In the linear displacement detection apparatus according to the present embodiment, the linear-to-rotary displacement converting mechanism is divided into the sensor rod 13 and the sensor lever 14. In the present structure, distortion, which is caused in conversion of the linear displacement of the control shaft 11 into the rotary displacement of the sensor lever 14 and the sensor rotor 15, can be absorbed. Thus, the elongated hole structure, which is provided between the shaft 101 and the sensor lever 104 and configured to absorb distortion by changing the turning radius R of the sensor lever 104 shown in prior art, need not be employed. Therefore, accuracy of detecting of the linear displacement of the control shaft 11 can be enhanced.

(One Feature of First Embodiment)

Here, in the linear displacement detection apparatus according to the present embodiment, the position of the contact portion between the spherical fitting head 52 and the cylinder portion 55 changes when converting the linear displacement as the linear motion of the control shaft 11 of the variable valve control mechanism 6 into the rotary displacement as the rotary motion of the sensor lever 14 and the sensor rotor 15. More specifically, the position of the contact portion between the spherical fitting head 52, which is integrally formed at the tip end of the sensor rod 13, and the cylinder portion 55, which is integrally provided to the end portion of the lever body 54 of the sensor lever 14, changes in the conversion of the linear motion to the rotary motion. Therefore, the present structure may cause the following three problems.

The first problem is that accuracy of detecting of the linear displacement of the control shaft 11 varies in dependence upon combination of the control shaft 11 and the linear-to-rotary displacement converting mechanism, which includes the sensor rod 13 and the sensor lever 14 In the present embodiment, the linear displacement of the control shaft 11, that is, the rotary displacement of the sensor lever 14 and the sensor rotor 15 of the rotation angle sensor 7 is detected and measured. Accuracy of the present detection of the linear displacement of the control shaft 11 varies in dependence upon determination of an intersection between a tangent of a rotation locus of the cylinder portion 55 of the sensor lever 14 and the rotation locus of the contact portion of the sensor lever 14. Here, the tangent is in parallel with the direction of the linear displacement of the control shaft 11 and the sensor rod 13. The accuracy of the present detection also varies in dependence upon determination of the measurement start point and the measurement end point.

Here, as a precondition, the inclination of the linear output voltage (theoretical value) of the rotation angle sensor 7 is 0.4 V/mm, the voltage value at the Lo-end is 1.1V, and the voltage value at the Hi-end is 3.9V. The rotation angle sensor 7 has the sensor characteristic such that the sensor output voltage (calculated) of the rotation angle sensor 7 is substantially linear with respect to the rotation angle of the sensor lever 14. The output of 1.1V is written at the Lo-end, and the output of 3.9V is written at the Hi-end. The liner displacement of the control shaft 11 and the sensor rod 13 is converted to the rotation displacement of the sensor lever 14 and the sensor rotor 15 of the rotation angle sensor 7 in line with the relation ship of:

sensor lever angle $(\theta)=\sin-1$ {(shaft poison−tangent position)/maximum linear displacement}.

The wording of sin−1 represents the arcsine transformation. The maximum linear displacement as the maximum stroke Z is, for example, 7 mm. The tangent position is a location of the intersection between the tangent of the rotation locus of the contact portion of the sensor lever 14 and the contact portion of the sensor lever 14. The tangent is in parallel with the linear displacement direction of the control shaft 11.

Figure 8A:
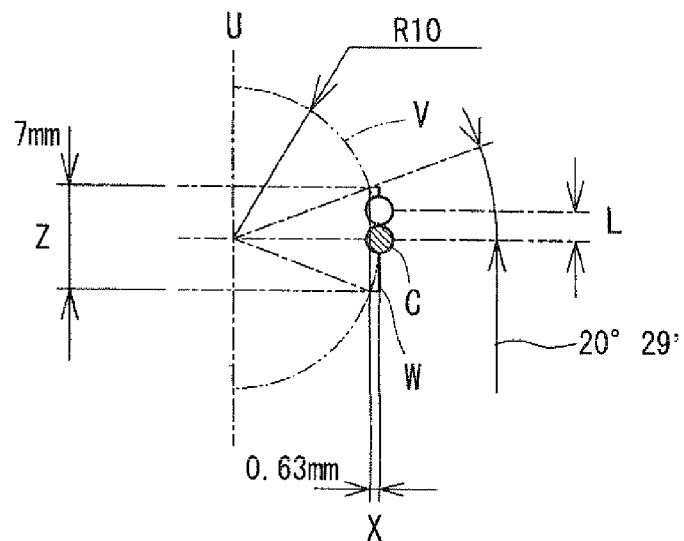
FIG. 8A is a schematic view showing a measurement start point, an intermediate point, and a measurement end point of the sensor lever.
Figure 8B:
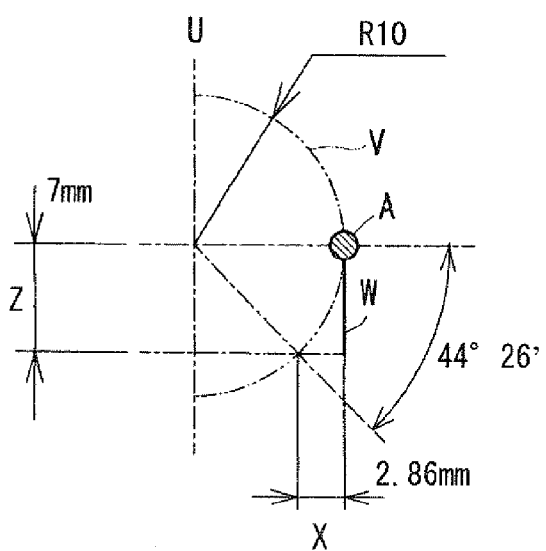
FIGS. 8B, 8C are schematic views each showing a measurement start point and a measurement end point of the sensor lever, according to the first embodiment.

First, as shown in FIG. 8B, the measurement start point (Lo-end) of the contact portion of the sensor lever 14 is set at the intersection (A). The intersection (A) is located between the tangent (W) of the rotation locus (V) of the contact portion of the sensor lever 14 and the rotation locus (V) of the contact portion of the sensor lever 14. The tangent (W) of the rotation locus (V) is in parallel with the axis (U) of the linear displacement direction as the movable direction of the control shaft 11. The measurement end point (Hi-end) of the contact portion of the sensor lever 14 is set at the location, which is displaced from the intersection (A) as the measurement start point (Lo-end) of the contact portion of the sensor lever 14 to the positive side for the length of Z along the tangent of the rotation locus (V) of the contact portion of the sensor lever 14. The length of Z is, for example, 7 mm. According to the present precondition, the sensor lever angle ($\theta$) and the sensor output voltage (calculated) satisfy the following relationship:

sensor-lever angle $\theta=\sin-1\{(L)/Z\}=\sin-1\{(L)/7$ mm}; and sensor output voltage=$f(\theta)+1.1V$.

Here, L denotes the motion as the shaft position of the control shaft 11 relative to the Lo-end (A).

Figure 8C:
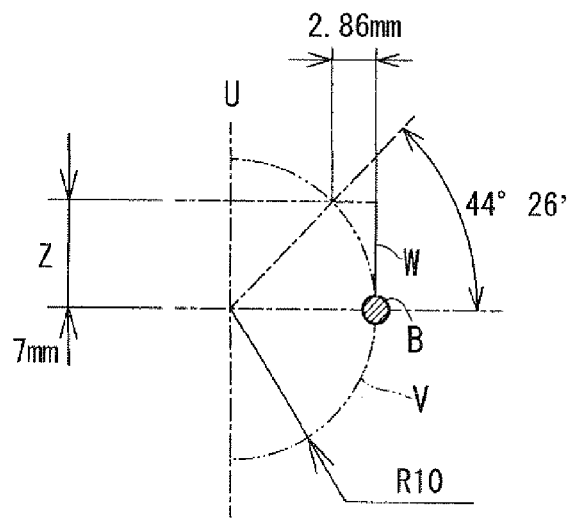

As shown in FIG. 8C, the measurement end point (Hi-end) of the contact portion of the sensor lever 14 is set at the intersection (B). The intersection (B) is located between the tangent (W) of the rotation locus (V) of the contact portion of the sensor lever 14 and the rotation locus (V) of the contact portion of the sensor lever 14. The tangent (W) of the rotation locus (V) is in parallel with the axis (U) of the linear displacement direction as the movable direction of the control shaft 11. The measurement start point (Lo-end) of the contact portion of the sensor lever 14 is set at the location, which is displaced from the intersection (B) as the measurement end point (Hi-end) of the contact portion of the sensor lever 14 to the negative side for the length (Z) along the tangent of the rotation locus (V) of the contact portion of the sensor lever 14. The length (Z) is, for example, 7 mm. According to the precondition, the sensor lever angle ($\theta$) and the sensor output voltage (calculated) satisfy the following relationship:

sensor-lever angle $\theta=\sin-1\{(L)/Z\}=\sin-1\{(L)/7$ mm}; and sensor output voltage=$3.9V-f(\theta)$.

Here, L denotes the motion as the shaft position of the control shaft 11 relative to the Hi-end (B) or the Lo-end.

Figure 9A:
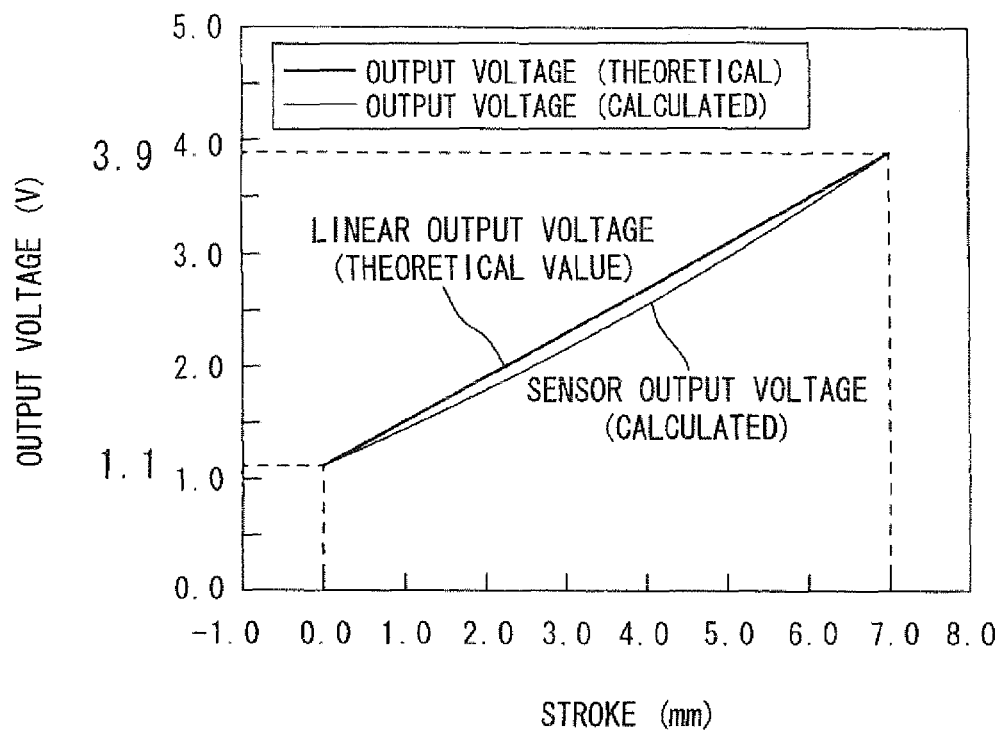
FIG. 9A is a graph showing a relationship between an output voltage of a rotation angle sensor and a stroke of the control shaft.

As described above, the measurement start point (Lo-end) of the contact portion of the sensor lever 14 is set at the intersection (A), or the measurement end point (Hi-end) of the contact portion of the sensor lever 14 is set at the intersection (B). In this case, as shown in FIGS. 9A, 9B, the linear output voltage (theoretical value) and the sensor output voltage (calculated) do not coincide with each other around the intermediate point, and have therebetween deviation of about ±0.5 mm from the median in the radial direction of the sensor lever 14.

Figure 9B:
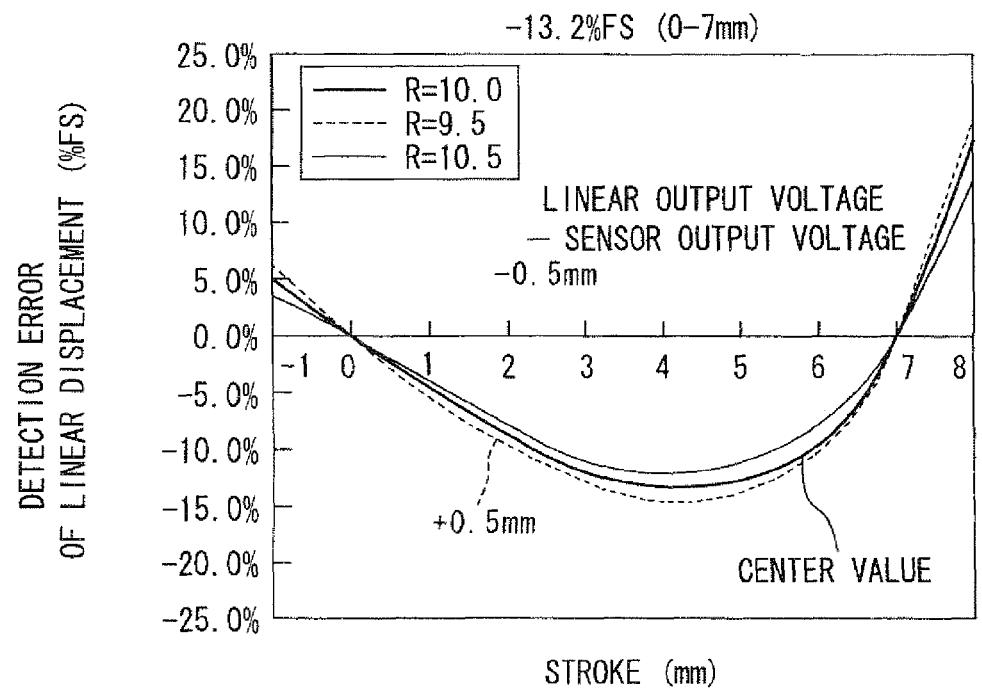
FIG. 9B is a graph showing a relationship between a detection error of a linear displacement and the stroke of the control shaft, according to the first embodiment.

FIG. 9B shows the change in detection error (FS) of the linear displacement relative to the stroke with respect to the turning radius (R) of the contact portion of the sensor lever 14 of 9.5 mm, 10.0 mm, and 10.5 mm. The turning radius (R) has the median of 10.0 mm. When the turning radius (R) is set at 9.5 mm, the deviation from the median in the radial direction of the sensor lever 14 is +0.5 mm. When the turning radius (R) is set at 10.5 mm, the deviation from the median in the radial direction of the sensor lever 14 is −0.5 mm.

The turning radius (R) of the contact portion of the sensor lever 14 is, for example, set at 10.0 mm. In this case, the inclination angle as the rod inclination of the fitting head 52, which is the contact portion of the sensor rod 13, in the direction perpendicular to the axial direction of the control shaft 11 is large. Consequently, at the measurement end point (Hi-end) of the contact portion of the sensor lever 14 or at the measurement start point (Lo-end) of the contact portion of the sensor lever 14, a lateral deviation (X) of 2.86 mm occurs with respect to the tangent (W) of the rotation locus (V) of the contact portion of the sensor lever 14.

In the case where the measurement start point (Lo-end) of the contact portion of the sensor lever 14 is set at the intersection A, an error (linear displacement-rotary displacement conversion error) of the linear displacement detection of the control shaft 11 is −13.2% FS in a range of 0-7 mm (MAXθ=44°26'. In the case where the measurement end point (Hi-end) of the contact portion of the sensor lever 14 is set at the intersection B, the error (linear displacement-rotary displacement conversion error) of the linear displacement detection of the control shaft 11 is +13.2% FS in the range of 0-7 mm (MAXθ=44°26').

As shown in FIG. 8A, an intermediate point (for example, 3.5 mm) of the maximum linear displacement (Z) (for example, 7 mm) of the control shaft 11 is set at an intersection (C). The intersection (C) is defined between the tangent (W) of the rotation locus (V) of the contact portion of the sensor lever 14 and the rotation locus (V) of the contact portion of the sensor lever 14. The tangent (W) is in parallel with the direction of the linear displacement of the control shaft 11. In this case, the sensor lever angle (θ) and the sensor output voltage (calculated) are as described follows.

In this case, the measurement start point (Lo-end) of the contact portion of the sensor lever 14 is defined at a point displaced from the intermediate point of the maximum linear displacement (Z) of the control shaft 11 for the length of Z/2 (for example, 3.5 mm) toward the negative side in the tangential direction of the rotation locus (V) of the contact portion of the sensor lever 14. The measurement end point (Hi-end) of the contact portion of the sensor lever 14 is defined at a point displaced from the intermediate point of the maximum linear displacement (Z) of the control shaft 11 for the length of Z/2 (for example, 3.5 mm) toward the positive side in the tangential direction of the rotation locus (V) of the contact portion of the sensor lever 14. In this case, the intermediate point of the maximum linear displacement (Z) of the control shaft 11 is located at the center position in the range from the measurement start point (Lo-end) of the contact portion of the sensor lever 14 to the measurement end point (Hi-end) in the rotation angle sensor 7. The sensor-lever angle θ is defined such that:

sensor-lever angle θ=Sin−1{(L−(Z/2))/Z}=Sin−1{(L−3.5 mm)/7 mm}; and sensor output voltage=$f$(θ)+2.5V.

Here, L denotes the motion as the shaft position of the control shaft 11 relative to the intermediate point (C) between the Hi-end and the Lo-end.

Figure 10B:
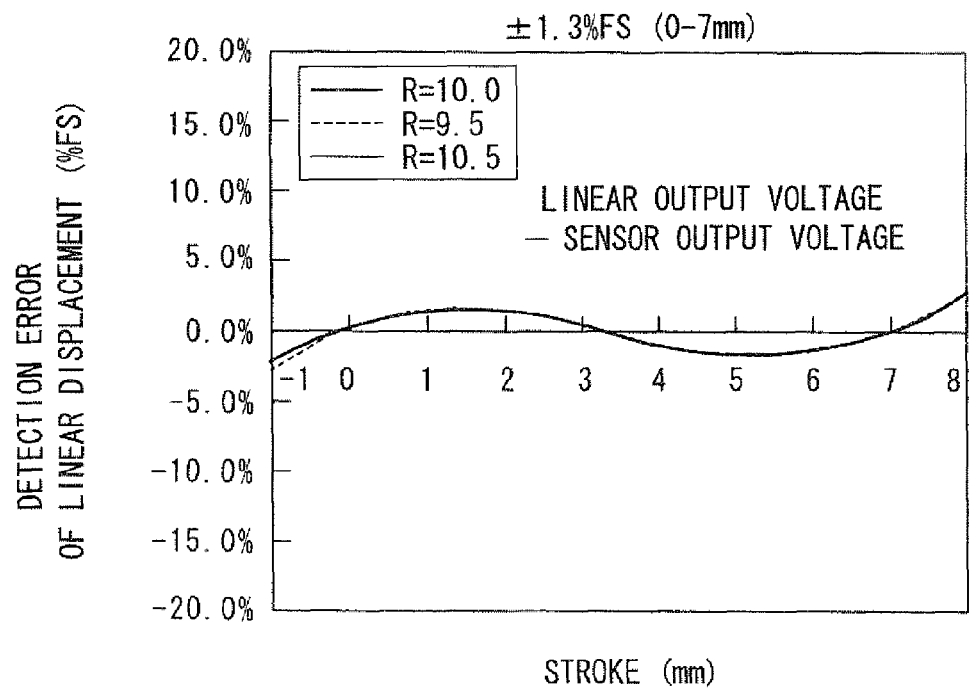
FIG. 10B is a graph showing a relationship between a detection error of a linear displacement and the stroke of the control shaft, according to the first embodiment.

As described above, the measurement start point (Lo-end) and the measurement end point (Hi-end) of the contact portion of the sensor lever 14 are determined evenly at both sides relative to the intermediate point (for example, 3.5 mm) of the maximum linear displacement (Z) of the control shaft 11 (for example, 7 mm). In this case, as shown in FIGS. 10A, 10B, the linear output voltage (theoretical value) and the sensor output voltage (calculated) substantially coincide with each other. In FIG. 10B, the turning radius (R) of the contact portion of the sensor lever 14 is set at 9.5 mm, 10.0 mm, and 10.5 mm, and change in the linear displacement detection error (FS) relative to the stroke is obtained. Even the turning radius (R) of the contact portion of the sensor lever 14 is changed, the linear displacement detection error is confined within ±1.3% FS.

For example, when the turning radius (R) of the contact portion of the sensor lever 14 is set at 10.0 mm, the lateral deviation (X) of each of the position of the measurement start point (Lo-end) of the contact portion of the sensor lever 14 and the measurement end point (Hi-end) of the contact portion of the sensor lever 14 with respect to the tangent (W) of the rotation locus (V) of the contact portion of the sensor lever 14 can be reduced within 0.63 mm. Thus, inclination of the fitting head (contact portion) 52 of the sensor rod 13 becomes small, and hence the lateral deviation caused in the contact portion between the fitting head (contact portion) 52 of the sensor rod 13 and the cylinder portion (contact portion) 55 of the sensor lever 14 becomes small.

As described above, the measurement start point (Lo-end) and the measurement end point (Hi-end) of the contact portion of the sensor lever 14 are determined evenly at both sides relative to the intermediate point (for example, 3.5 mm) of the maximum linear displacement (Z) of the control shaft 11 (for example, 7 mm). That is, the intermediate point is determined at the tangent position. In this case, the linear displacement detection error (linear displacement-rotary displacement conversion error) of the control shaft 11 is ±1.3% FS in the range of 0-7 mm (MAXθ=20°29'). That is, the linear-rotation conversion error is the minimum at the intermediate point.

In the rotation angle sensor 7 according to the present embodiment, the intersection (C) between the tangent (W) of the rotation locus (V) of the contact portion of the sensor lever 14 and the rotation locus (V) of the contact portion of the sensor lever 14 is determined at the intermediate point of the maximum linear displacement (Z) (for example, 7 mm) of the control shaft 11. The tangent (W) is in parallel with the axis (U) of the linear displacement of the control shaft 11 in the movable direction. Thus, inclination of the fitting head (contact portion) 52 of the sensor rod 13 becomes small when the linear displacement of the control shaft 11 is converted into the rotary displacement of the sensor lever 14 and the sensor rotor 15 of the rotation angle sensor 7. Further, the lateral deviation caused in the contact portion between the fitting head (contact portion) 52 of the sensor rod 13 and the cylinder portion (contact portion) 55 of the sensor lever 14 becomes small. Therefore, accuracy of detecting the linear displacement of the control shaft 11 can be enhanced.

The second problem is the displacement caused between the fitting head (contact portion) 52 of the sensor rod 13 and the cylinder portion (contact portion) 55 of the sensor lever 14 according to the motion of the control shaft 11. As shown in FIGS. 7A to 7C and FIG. 11A, the motion as the maximum linear displacement (maximum stroke amount) of the control shaft 11 is 7 mm, and the height of the sensor rod 13 in the axial direction is 40 mm, for example. In this case, the fitting head 52 (contact portion) of the sensor rod 13 inclines relative to a vertical line, which is perpendicular to the axial direction of the control shaft 11, by 0°54' (rod inclination). Consequently, the motion of the control shaft 11 deviates from the rotation locus (V) of the contact portion of the sensor lever 14. More specifically, the fitting head (contact portion) 52 of the sensor rod 13 and the cylinder portion (contact portion) 55 of the sensor lever 14 therebetween cause a lateral deviation (X) of 0.630 mm and a vertical deviation (Y) of 0.005 mm.

The third problem is ablation caused between the fitting head (contact portion) 52 of the sensor rod 13 and the cylinder portion (contact portion) 55 of the sensor lever 14 resulting in aging, seizing, or the like. Therefore, the fitting head (contact portion) 52 of the sensor rod 13 and the cylinder portion (contact portion) 55 of the sensor lever 14 therebetween need a countermeasure against ablation.

Figure 11A:
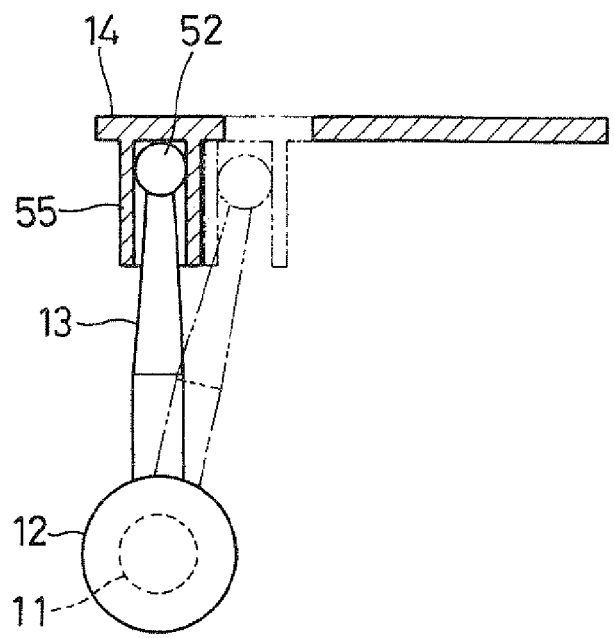
FIG. 11A is a schematic view showing a relationship between a motion of the control shaft and a motion of the sensor lever.
Figure 11B:
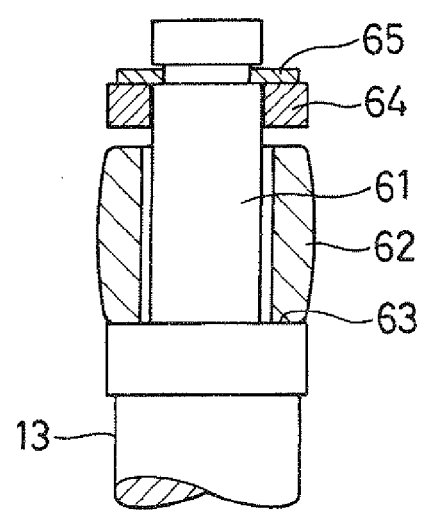
FIG. 11B is a partial sectional view showing a contact portion of a sensor rod, according to the first embodiment.
Figure 12:
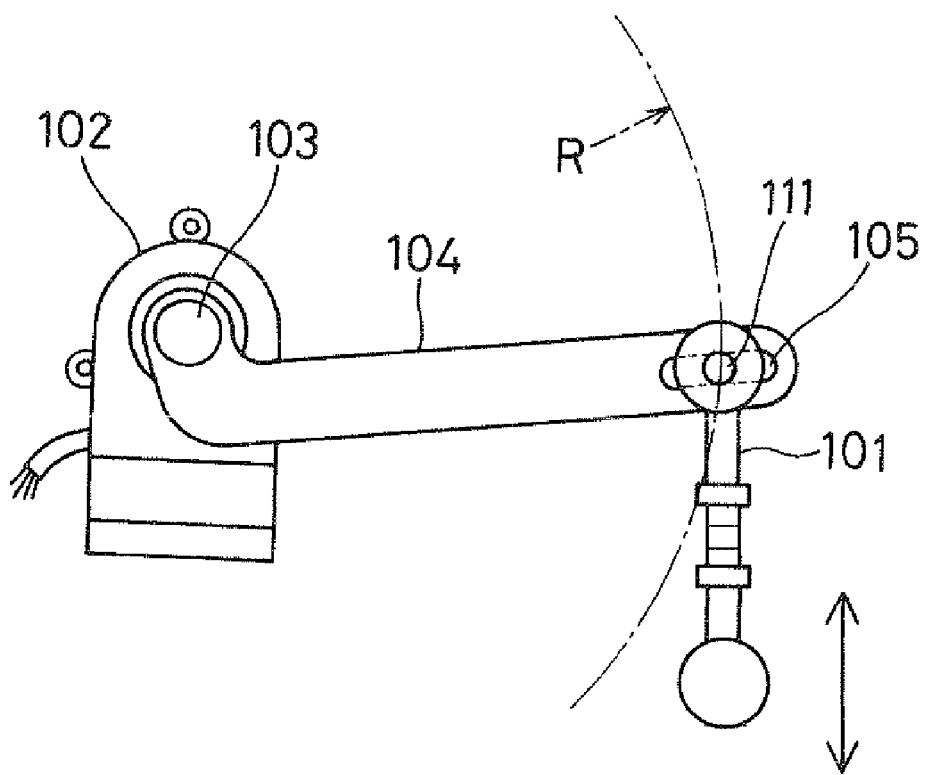
FIG. 12 is a schematic view showing a linear displacement detection apparatus according to a prior art.

FIG. 11B shows an example of a measure against the second and third problems. FIG. 11B shows the contact portion of the sensor rod 13. The contact portion of the sensor rod 13 is provided to the tip end of the sensor rod 13. The contact portion includes a shaft portion 61, a cylinder roller 62, a collar 64, a retaining ring (E-ring) 65, and the like. The shaft portion 61 has the outer diameter, which is smaller than the outer diameter of the main body 53 of the sensor rod 13. The cylinder roller 62 is rotatably fitted to the outer circumferential periphery of the shaft portion 61. The collar 64 is in an annular shape, and the collar 64 and an annular step 63 therebetween rotatably interpose the cylinder roller 62. The retaining ring 65 holds the collar 64.

The cylinder roller 62 as a contact portion with the cylinder portion 55 of the sensor lever 14 is in a paunch shape. Specifically, the outer diameter of the center portion of the cylinder roller 62 is larger than the both end portions of the cylinder roller 62 in the axial direction. In the present structure, the cylinder roller 62 is in the paunch shape, so that the contact face of the cylinder roller 62 of the sensor rod 13 maintains the contact condition even when the contact portion of the sensor rod 13 inclines. In addition, the position of the contact surface of the cylinder portion 55 of the sensor lever 14 is constant.

In the present structure, even in the condition where the contact portion of the sensor rod 13 inclines when the linear displacement of the control shaft 11 is converted into the rotary displacement of the sensor lever 14 and the sensor rotor 15 of the rotation angle sensor 7, the position of the contact face of the cylinder roller 62 of the sensor rod 13 being in the contact with the contact surface of the cylinder portion 55 of the sensor lever 14 can be maintained at a constant position. Therefore, lateral deviation and vertical deviation can be restricted in the contact portion between the cylinder roller 62 of the sensor rod 13 and the cylinder portion 55 of the sensor lever 14. Thus, the linear displacement detecting accuracy of the control shaft 11 can be secured. The cylinder roller 62 rotates, so that abrasion of the contact portion of the cylinder roller 62 of the sensor rod 13 and the cylinder portion 55 of the sensor lever 14 can be suppressed. Therefore, abrasion resistance of the cylinder roller 62 of the sensor rod 13 or the cylinder portion 55 of the sensor lever 14 can be enhanced.

(Modification)

In the present embodiment, the above structure is applied to the linear displacement detection apparatus configured to convert the linear displacement as the linear motion in the axial direction of the control shaft 11 of the variable valve control mechanism 6 to the rotary displacement as the rotary motion of the sensor lever 14 and the sensor rotor 15 of the rotation angle sensor 7 so as to detect and measure the linear displacement. Alternatively, the above structure according to the embodiment may be applied to another linear displacement detection apparatus configured to convert a linear displacement as a linear motion of another shaft to a rotary displacement as a rotary motion of a sensor lever and a sensor rotor of a rotation angle sensor so as to detect and measure the linear displacement. For example, the above structure according to the embodiment may be applied to a car height sensor or the like, which is mounted to a vehicle such as an automobile.

In the present embodiment, the linear displacement detection apparatus is used, for example, as the linear displacement sensor (stroke sensor) for performing a malfunction-diagnosis determination (on board diagnosis OBD) of the variable valve control mechanism 6. Alternatively, the linear displacement detection apparatus may be used as a linear displacement sensor (stroke sensor) for performing a feedback control of a valve lift of the variable valve control mechanism 6.

In the present embodiment, the rotation angle sensor 7 having the hall IC is employed as the rotation angle sensor. The hall IC is the non-contact type magnetism detection element for detecting the magnetic flux generated from the magnet. Alternatively, a resistance-sliding type rotation angle sensor may be employed as the rotation angle sensor.

In the present embodiment, the linear displacement detection apparatus is applied to the inline four-cylinder engine, which has multiple cylinders. Alternatively, the linear displacement detection apparatus may be applied to an internal combustion engine, which has multiple banks each having at least one cylinder. The engine having multiple cylinder banks may be a multi-cylinder engine such as a v-type engine, a flat-type engine, and a horizontally-opposed engine.

The internal combustion engine may be a diesel engine. The number of the cylinders may be arbitrary determined.

The valve lift of the exhaust valve may be manipulated using the variable valve control mechanism. In this case, the valve lift of the exhaust valve can be measured by detecting the linear displacement of the control shaft using the linear displacement detection apparatus.

Various modifications and alternations may be diversely made to the above embodiments without departing from the spirit of the present invention.

What is claimed is:

1. A linear displacement detection apparatus for converting a linear displacement of a shaft into a rotary displacement of a sensor rotor of a rotary displacement sensor so as to detect the linear displacement, the linear displacement detection apparatus comprising:
   a sensor lever connected to the sensor rotor and rotatable about an axis of the sensor rotor;
   a sensor rod located closer to the shaft than the sensor lever and configured to transmit the linear displacement of the shaft to the sensor lever; and
   a bearing member located closer to the shaft than the sensor rod and configured to release rocking of the shaft.

2. The linear displacement detection apparatus according to claim 1,
   wherein the sensor rod and the sensor lever are discrete components, and
   the sensor rod and the sensor lever are configured as a linear-to-rotary displacement converting mechanism for converting the linear displacement of the shaft into the rotary displacement of the sensor rotor.

3. The linear displacement detection apparatus according to claim 1, wherein the bearing member is located between the shaft and the sensor rod.

4. The linear displacement detection apparatus according to claim 1, further comprising:
   an actuator for linearly actuating the shaft in an axial direction and configured to cause the linear displacement, wherein the shaft has a fitted portion at a side of the actuator, and the bearing member is fitted to an outer circumferential periphery of the fitted portion.

5. The linear displacement detection apparatus according to claim 1, wherein the bearing member is substantially in an annular shape, and the sensor rod has a holding portion, which is substantially in an annular shape and configured to hold the bearing member.

6. The linear displacement detection apparatus according to claim 1, wherein the sensor rod has a first contact portion configured to be in contact with the sensor lever, and the sensor lever has a second contact portion configured to be in contact with the first contact portion of the sensor rod.

7. The linear displacement detection apparatus according to claim 6, wherein the second contact portion of the sensor lever is a cylinder portion integrally formed with the sensor lever, the cylinder portion is configured to be inserted with the sensor rod, and the cylinder portion has an inner wall surface defining a contact surface configured to be in contact with a contact face of the first contact portion of the sensor rod.

8. The linear displacement detection apparatus according to claim 6, wherein the first contact portion of the sensor rod is a fitting head integrally formed with the sensor rod, and the fitting head is substantially in a spherical shape.

9. The linear displacement detection apparatus according to claim 6, wherein the first contact portion of the sensor rod is a cylinder roller rotatable about an outer circumferential periphery of the sensor rod, and the cylinder roller is substantially in a paunch shape.

10. The linear displacement detection apparatus according to claim 1, wherein the rotary displacement sensor includes a magnet, which is fixed to the sensor rotor, and a magnetism detection element, which is configured to detect a magnetic flux generated from the magnet in a non-contact manner, and the rotary displacement sensor is configured to detect a rotation angle of one of the sensor rotor and the sensor lever in accordance with an output change characteristic of the magnetism detection element with respect to the rotation angle of the magnet.

11. The linear displacement detection apparatus according to claim 1, wherein the sensor lever has a contact portion configured to be in contact with the sensor rod, the contact portion of the sensor lever is movable along a rotation locus, the rotation locus and a tangent of the rotation locus therebetween define an intersection, the tangent being in parallel with a direction of the linear displacement of the shaft, and the intersection is an intermediate point of a maximum linear displacement of the shaft in the rotary displacement sensor.

12. The linear displacement detection apparatus according to claim 11, wherein the intermediate point of the maximum linear displacement of the shaft is located at a center between a start point of a measurement of the rotary displacement sensor and an end point of the measurement of the rotary displacement sensor.

13. The linear displacement detection apparatus according to claim 1, wherein the bearing member is configured to restrict transmission of torsion of the shaft about a center axis of the shaft to the sensor rod and the sensor lever.

14. The linear displacement detection apparatus according to claim 13, wherein the sensor rod is rotatable about the center axis of the shaft via the bearing member.

15. The linear displacement detection apparatus according to claim 14, wherein the sensor rod is connected with the sensor lever, and the sensor rod is rotatable about a center axis of the sensor rod.

16. The linear displacement detection apparatus according to claim 1, wherein the sensor rotor has a rotation axis being substantially perpendicular to a center axis of the shaft.

17. The linear displacement detection apparatus according to claim 1, wherein the bearing member is a radial bearing configured to support the shaft in a radial direction of the shaft.

* * * * *